(12) United States Patent
Do

(10) Patent No.: US 6,620,471 B1
(45) Date of Patent: Sep. 16, 2003

(54) COMPOSITE CARBON FIBRE BASED ARMOUR FOR FLEXIBLE PIPE

(75) Inventor: Anh Tuan Do, Cormeilles en Parisis (FR)

(73) Assignee: Coflexip (FR)

( * ) Notice: Subject to any disclaimer, the term of this patent is extended or adjusted under 35 U.S.C. 154(b) by 0 days.

(21) Appl. No.: 09/646,024

(22) PCT Filed: Feb. 4, 1999

(86) PCT No.: PCT/FR99/00239
§ 371 (c)(1),
(2), (4) Date: Sep. 12, 2000

(87) PCT Pub. No.: WO99/49259
PCT Pub. Date: Sep. 30, 1999

(30) Foreign Application Priority Data

Mar. 23, 1998 (FR) .............................. 98 03547

(51) Int. Cl.⁷ .............................. A47G 19/22
(52) U.S. Cl. .................. 428/34.5; 428/34.3; 428/292.1; 428/293.4; 428/293.7; 428/297.4; 428/298.1; 428/299.1; 428/299.7
(58) Field of Search ............... 428/36.1, 226, 428/229, 240, 34.1, 34.3, 34.4, 34.5, 292.1, 293.4, 293.7, 297.4, 298.1, 299.1, 299.4, 299.7

(56) References Cited

U.S. PATENT DOCUMENTS 2,129,110 A * 6/1938 Weaver
5,082,701 A * 1/1992 Craven ..................... 428/34.5

FOREIGN PATENT DOCUMENTS

| FR | 2158731 | 6/1973 |
| FR | 2430400 | 2/1980 |
| FR | 2538077 | 6/1984 |
| FR | 2739673 | 4/1997 |
| FR | 2739674 | 4/1997 |

* cited by examiner

Primary Examiner—Merrick Dixon
(74) Attorney, Agent, or Firm—Ostrolenk, Faber, Gerb & Soffen, LLP

(57) ABSTRACT

An ultra dense composite strip for flexible pipe having armouring formed of longitudinal carbon fibers provided within a thermoplastic or thermosetting matrix in the form of a flat ribbon with a substantially rectangular cross-section, whereof at least one of the surfaces of the strip is reinforced with a film made integral with said surface, over substantially its whole width and over substantially its whole length.

20 Claims, 1 Drawing Sheet

COMPOSITE CARBON FIBRE BASED ARMOUR FOR FLEXIBLE PIPE

BACKGROUND OF THE INVENTION

The present invention relates to an ultra dense composite strip for flexible pipe armour, of the type comprising longitudinal rovings having high mechanical properties, such as carbon fibres, placed within a matrix of thermoplastic or thermosetting material, in the form of a flat tape of approximately rectangular cross section.

Documents FR 2,739,673 A and FR 2,739,674 A, the teaching of which is incorporated here for reference, disclose armour based on a woven strip, for flexible pipe, especially pipe used in deep sea applications in the oil industry. This strip is preferably based on aramid resin ("Kevlar") fibres, although other fibre materials are not excluded. Moreover, strips are also known which are made of a fibre-reinforced composite plastic (fibre-reinforced plastic or FRP strips) consisting especially of rovings of juxtaposed parallel fibres contained in a matrix of thermoplastic material (such as a polyamide) or thermosetting material (such as an epoxy resin), the said matrix being continuous longitudinally and transversely to the axis of the rovings, the matrix embedding each filament in a continuous manner so as to hold the filaments together. The fibres used are generally glass or aramid fibres. However, owing to the drawbacks encountered, for example, with glass fibres under certain extreme operating conditions (the relatively large thickness of the tapes obtained possibly resulting in fibre fractures, causing partial or complete failure of the armour under certain bending and/or torsional stresses), the idea of using reinforcing fibres having high mechanical properties, such as ceramic or carbon fibres, was born, these fibres, and especially carbon fibres, being renowned for their high tenacity and their great chemical inertness, carbon fibre being moreover the most accessible of the fibres having high mechanical properties.

However, the use of fibres such as fibres having high mechanical properties, such as carbon fibres, for flexible pipe armour gives rise to difficulties which it is the objective of the present invention to solve.

SUMMARY OF THE INVENTION

This objective is achieved within the context of the invention by means of an ultra dense composite strip for flexible pipe armour, of the type comprising longitudinal rovings of fibres having high mechanical properties, such as carbon fibres, placed within a matrix of thermoplastic or thermosetting material, in the form of a flat tape of approximately rectangular cross section, at least one of the faces— the upper or lower face—of which is reinforced by a film fastened to the said face over approximately its entire width and over approximately its entire length.

This is because it was noticed that, by this apparently simple means, it is possible to remedy the lack of transverse shear strength (tear strength) characteristic of an ultra dense flat tape of the carbon-fibre-based type in question, having a small thickness (typically less than 1 mm) so as to be able to be wound around a cylindrical core, the diameter of which may be only of the order of 100 mm. There is a risk that the torsional and bending stresses imposed on such a thin flat strip when winding it to a small diameter, or when the flexible pipe undergoes axial compression, initiate longitudinal tears within the strip, tears which easily propagate throughout the strip. The film of the invention prevents the tearing from being initiated, or at the very least from propagating. It therefore allows the strip to be wound to smaller diameters and improves the buckling resistance of the armour (during the phenomenon commonly called the inverse or compressive end cap effect due to the effect of the external pressure exerted on the ends of the flexible pipe). The thickness of the film according to the invention is of the order of one tenth of that of the strip.

The film covers the said face continuously or even discontinuously over its length, and continuously over its width.

The film may be a plastic film, either a homogeneous film or one containing fibres which may be short and form a discontinuous reinforcement (a mat) or which may be long and form a continuous reinforcement (an impregnated woven or an impregnated nonwoven). The fastening of the film is obtained by sheathing completely around the strip (the sleeve being adherent or non-adherent) or, when the fastening involves only certain faces of the strip, it takes place by adhesive bonding, or by simultaneous lamination with a thermoplastic or thermosetting material during the process of manufacturing the strip.

The tape may be covered with several thicknesses of films, the films being identical or different.

When the film is or contains a woven, the two main directions of the woven are advantageously placed obliquely with respect to the longitudinal direction of the tape, preferably making an angle of between 30° and 65° with this direction.

The fibres incorporated into the film and/or forming the woven are fibres chosen for their specific properties and especially their chemical resistance, most generally from the following materials: carbon, glass, aramid resin.

The invention will be more clearly understood by means of the following description, with reference to the appended drawings in which:

DESCRIPTION OF PREFERRED EMBODIMENTS

Figure 1:
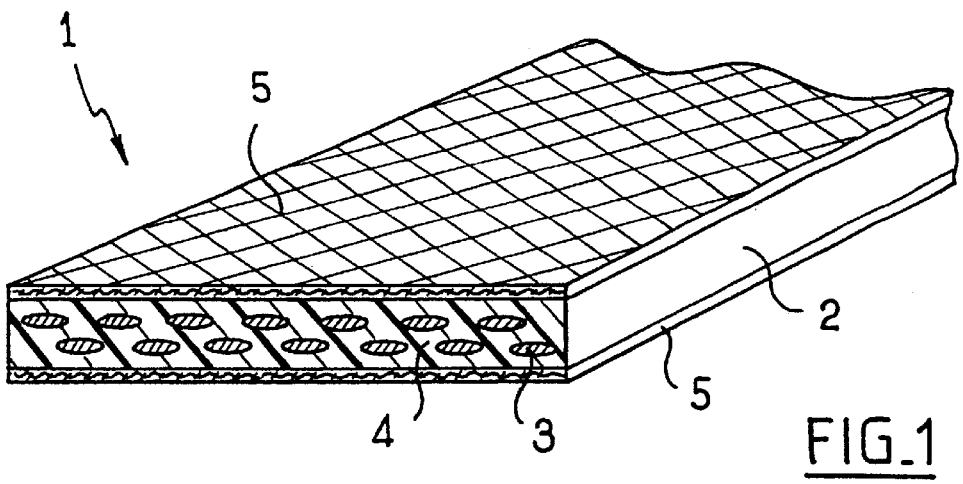
FIG. 1 is a perspective view of a first embodiment of a strip according to the invention, the tape being covered continuously with a woven on both its faces.

The strip 1 of the invention comprises a flat tape 2 made with a great length and a cross section, for example, of 13 mm to 15 mm in width and 0.5 mm to 1.0 mm in thickness. The tape comprises continuous longitudinal carbon fibre rovings 3 embedded in a matrix 4 of a thermoplastic material or a thermosetting material (for example of the epoxy type, the composite being produced by continuous pultrusion or thermoforming of the pre-impregnated rovings); the tape is of the ultra dense type, that is to say the fibre volume fraction is greater than 50% and preferably greater than or equal to 70%. This small thickness and this high fibre volume fraction allow the end product to meet the general requirements imposed by the specification for flexible pipe armour.

However, if the strength in the longitudinal direction is particularly satisfactory, it is recommended according to the invention to reinforce the composite in other directions in space in order to absorb the transverse stresses induced by the bending and the torsion. This is achieved by fastening, to at least one large face of the tape 2, a woven 5, the weaving angle and the fibre of which are chosen so that the end product remains flexible and behaves better in shear.

Figure 2:
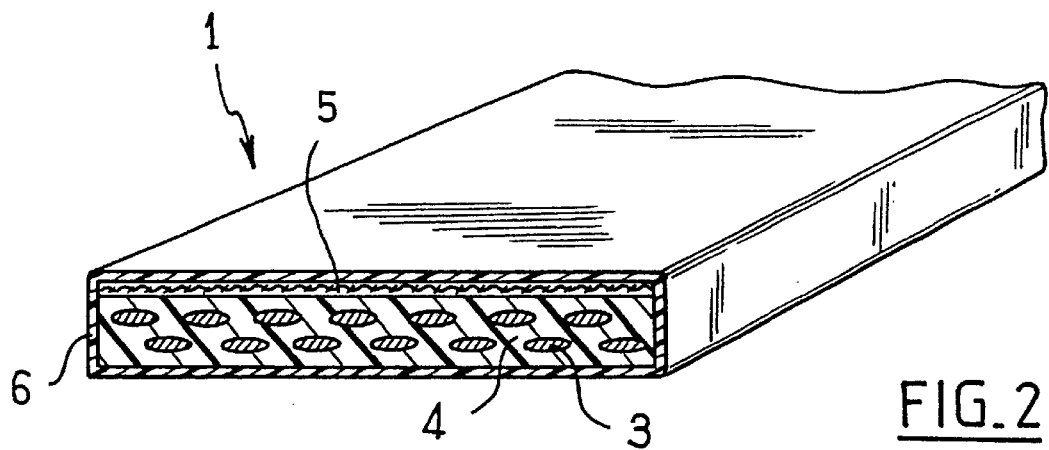
FIG. 2 is a perspective view of a second embodiment of a strip according to the invention, the tape being firstly covered with a woven on one face and then sheathed with a film.
Figure 3:
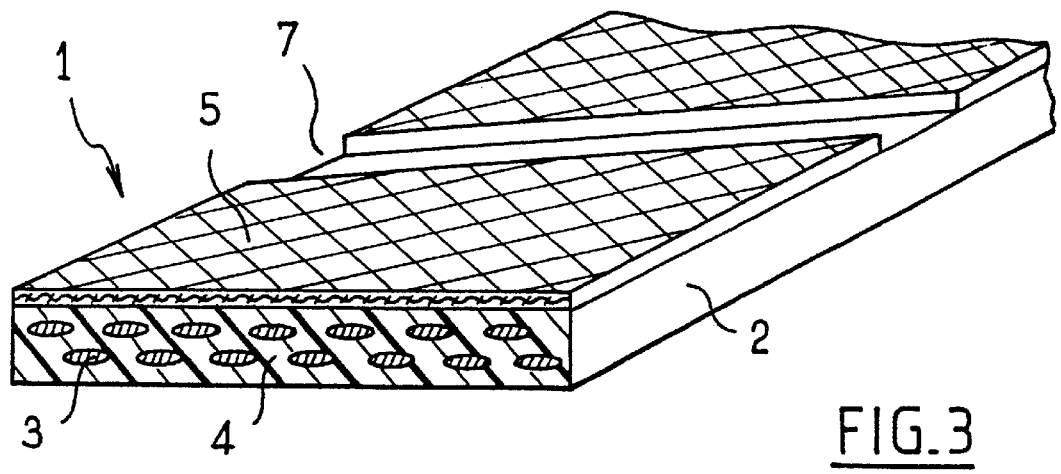
FIG. 3 is a perspective view of a third embodiment of a strip according to the invention, the tape being covered with a woven on one face in a discontinuous manner.

The woven, preferably having a thickness of less than 0.1 mm, may be placed on only one face—the concave or convex face of the armour—or on both faces (FIG. 1), followed where appropriate by the sheathing by a thin film 6 (FIG. 2). The woven preferably covers the entire width of the tape and extends over the length of the latter, possibly with discontinuities 7 which do not impair its function. Such discontinuities may, for example, be formed obliquely with respect to the tape and the length of the discontinuity is, for example, less than 10 mm while the length of the continuous parts is of the order of 10 to 100 mm.

The woven may simply be adhesively bonded. It may also be incorporated during the process for manufacturing the strip. For a tape made of thermoplastic material, the woven, whether coated or not, may be deposited by a continuous calendering system. For a tape made of thermosetting material, the conventional continuous pultrusion or thermoforming operations allow one or more laminates based on a woven to be added without any difficulties.

The woven may be placed with its weft or its warp in the longitudinal direction of the strip, but it is preferable, if it is desired to give the end product better flexibility and above all better absorption of the shear stresses using most of the fibres, to place the woven obliquely, its two main directions making the same angle of between ±30° and ±65° with the longitudinal direction.

The fibre used for the woven may be chosen depending on the particular requirements. For example, glass fibre makes it possible to insulate the carbon and prevents coupling with the steel members, and therefore prevents galvanic corrosion. Aramid fibre also allows electrical insulation; in addition, this fibre impregnated with a thermosetting or thermoplastic material gives the resulting armour remarkable tribological properties.

The film 6 may also be used by itself, that is to say without a woven 5. The film 6 is advantageously sheathed by extrusion, for example with polyolefins (polyethylene or polypropylene), polyurethane or polyamide. The thickness of the film 6 takes into account the physical properties of the plastics used and is advantageously about 0.05 mm to 0.1 mm. Tests carried out with a strip made of carbon fibre impregnated with epoxy resin, having a cross section of 13 mm×0.9 mm and sheathed with polyurethane, have shown that the strip can withstand a twist of at least three turns/metre without any damage.

A film, for example made of "Mylar" (a DuPont de Nemours trade mark) may also be adhesively bonded, like the woven 5, to only one face or to both faces. It is also possible to use a mat film (a thermoplastic reinforced with short or discontinuous fibres), like the one known by the name "Tyvek" (DuPont de Nemours trade mark).

According to another technique, it is possible to cover the impregnated, but not yet cured, composite strip with a non-impregnated mat and then to take the assembly into the curing chamber in order to crosslink the assembly.

Several of these techniques may be combined by covering the composite strip respectively with a long-fibre woven, then with a mat and then with a film proper. It is possible for the long-fibre woven and the mat to be reversed.

In another embodiment, not shown, the woven 5 may be replaced by a winding of a fibre around the flat tape 2, the angle of wind of the yarn being between 80° and 90°, and preferably 89°.

What is claimed is:

1. Ultra dense composite strip for use as flexible pipe armor comprising:

a length of strip of a flat tape of approximately rectangular cross-section comprised of longitudinal rovings of fibers having high mechanical properties, a matrix of thermoplastic or thermosetting material in which the fibers are embedded to define the flat tape, the flat tape being without fibers extending across the longitudinal rovings;

the tape having opposite faces; a reinforcing film disposed over at least one of the faces of the tape and fastened to the face over approximately the entire width and over approximately the entire length of the face.

2. The strip of claim 1, wherein the fibers of the rovings are carbon fibers.

3. The strip of claim 1, wherein the film is a plastic film.

4. The strip of claim 3, wherein the tape has a first thickness between the faces thereof and the plastic film has a thickness on the order of one-tenth the thickness of the tape.

5. The strip of claim 1, further comprising reinforcing fibers in the film.

6. The strip of claim 5, wherein the reinforcing fibers are discontinuous fibers forming a mat.

7. The strip of claim 5, wherein the reinforcing fibers are continuous fibers.

8. The strip of claim 7, wherein the reinforcing fibers form a non-woven.

9. The strip of claim 7, wherein the reinforcing fibers form a woven.

10. The strip of claim 9, wherein the woven comprises fibers chosen from the group consisting of glass, carbon and aramid resin.

11. The strip of claim 7, wherein the woven comprises fibers chosen from the group consisting of glass, carbon and aramid resin.

12. The strip of claim 1, wherein the film is discontinuous, extending over the length of the at least one face of the tape.

13. The strip of claim 1, wherein the film covers the at least one face of the tape continuously over its length.

14. The strip of claim 13, wherein the film covers the at least one face of the tape continuously over its width.

15. The strip of claim 1, wherein the film covers the at least one the face of the tape continuously over its width.

16. The strip of claim 9, wherein the woven is comprised of continuous fibers having two main weaving directions.

17. The strip of claim 16, wherein the weaving directions of the fibers of the woven are oblique with respect to the longitudinal direction of the tape.

18. The strip of claim 17, wherein the weaving directions of the fibers in the woven are at an angle of between 30° and 65° with respect to the longitudinal direction of the tape.

19. The strip of claim 1, wherein the film is fastened to the tape by one of sheathing, adhesive bonding or lamination.

20. The strip of claim 9, wherein the woven comprises a winding of the fiber around the flat tape and having a wind angle close to 90°.

* * * * *